US006039880A

United States Patent [19]

Morataya

[11] Patent Number: 6,039,880

[45] Date of Patent: Mar. 21, 2000

[54] METHOD FOR DEHYDRATING A WASTE HYDROCARBON SLUDGE

[75] Inventor: Carmen Morataya, Caracas, Venezuela

[73] Assignee: Intevep, S.A., Caracus, Venezuela

[21] Appl. No.: 09/028,533

[22] Filed: Feb. 24, 1998

[51] Int. Cl.[7] ........ C02F 1/52

[52] U.S. Cl. ........ 210/708; 208/188; 210/726; 210/727; 210/728; 210/734; 210/735; 210/752; 210/774

[58] Field of Search ........ 208/187, 188; 210/708, 723, 726, 727, 728, 734, 735, 752, 774

[56] References Cited

U.S. PATENT DOCUMENTS

| | | | |
|---|---|---|---|
| 3,907,701 | 9/1975 | Liebold et al. | 252/344 |
| 4,026,794 | 5/1977 | Mauceri | 210/43 |
| 4,417,976 | 11/1983 | Sander et al. | 210/708 |
| 4,444,654 | 4/1984 | Cargle et al. | 210/708 |
| 4,466,885 | 8/1984 | Ronden | 208/188 |
| 4,539,100 | 9/1985 | Ronden | 208/188 |
| 4,737,265 | 4/1988 | Merchant, Jr. et al. | 210/708 |
| 5,100,559 | 3/1992 | Sealock, Jr. et al. | 210/708 |
| 5,458,765 | 10/1995 | West | 208/188 |

*Primary Examiner*—David A. Simmons
*Assistant Examiner*—Betsy J. Morrison
*Attorney, Agent, or Firm*—Bachman & LaPointe, P.C.

[57] ABSTRACT

A method for dehydrating a waste hydrocarbon sludge, includes the steps of: (a) providing a waste hydrocarbon sludge in the form of an emulsion of water and oil having a water content greater than or equal to about 10% vol; (b) providing a solution of a clarifying agent in formation water; (c) mixing the waste hydrocarbon sludge with the solution so as to provide a sludge-water mixture having a ratio of water to hydrocarbon of at least about 1:1; (d) adding a demulsifier to the sludge-water mixture to provide a sludge-water-demulsifier mixture; (e) heating the sludge-water-demulsifier mixture to a sufficient temperature and holding for a time sufficient to provide a hydrocarbon phase having a water content of less than or equal to about 1% vol.

15 Claims, 3 Drawing Sheets

METHOD FOR DEHYDRATING A WASTE HYDROCARBON SLUDGE

BACKGROUND OF THE INVENTION

The present invention relates to a method for dehydrating a waste hydrocarbon sludge, especially for dehydrating an aged waste oil sludge in the form of a water-in-oil emulsion, an oil-in-water emulsion or mixtures thereof.

In the course of completion, production and refining of crude oils and other hydrocarbons, a waste oil sludge is frequently produced which consists of an emulsion of water and oil such as a water-in-oil emulsion or an oil-in-water emulsion or a mixture thereof, which is itself difficult to dispose of in an environmentally acceptable manner, and which further contains components which, if separated, are valuable components for other processes.

Conventional processes exist for dehydrating a heavy hydrocarbon, but these processes typically require large amounts of additives, and/or heating for long periods and at high temperatures, and are inefficient for use with emulsionated waste oil sludge.

Thus, the need remains for a method for dehydrating a waste oil sludge which is efficient and cost effective and which provides for a desirable reduction of water and solids content in the resulting commercially valuable hydrocarbon phase.

It is therefore the primary object of the present invention to provide a method for dehydrating a waste hydrocarbon sludge wherein formation water is advantageously used as wash water.

It is a further object of the present invention to provide a method for dehydrating a waste hydrocarbon sludge which utilizes greatly reduced amounts of additives and, thereby, is more cost effective.

It is still another object of the present invention to provide a method for dehydrating a waste oil sludge which produces useful end products including crudes with commercial value, and production water ready for final disposal.

Other objects and advantages of the present invention will appear hereinbelow.

SUMMARY OF THE INVENTION

In accordance with the present invention, the foregoing objects and advantages are readily attained.

A method for dehydrating a waste hydrocarbon sludge, comprising the steps of: (a) providing a waste hydrocarbon sludge comprising an emulsion of water and oil having a water content greater than or equal to about 10% vol; (b) providing a solution of a clarifying agent in formation water; (c) mixing the waste hydrocarbon sludge with the solution so as to provide a sludge-water mixture having a ratio of water to hydrocarbon of at least about 1:1; (d) adding a demulsifier to the sludge-water mixture to provide a sludge-water-demulsifier mixture; (e) heating the sludge-water-demulsifier mixture to a sufficient temperature and holding for a time sufficient to provide a hydrocarbon phase having a water content of less than or equal to about 1% vol.

BRIEF DESCRIPTION OF THE DRAWINGS

A detailed description of preferred embodiments of the present invention follows, with reference to the attached drawings, wherein.

DETAILED DESCRIPTION

The invention relates to a method for dehydrating a waste hydrocarbon sludge, particularly an aged waste oil sludge in the form of an emulsion such as a water-in-oil emulsion, an oil-in-water emulsion, or mixtures thereof, wherein the oil phase is a hydrocarbon for example resulting from production well testing, completion, production and/or refinery operations.

In accordance with the invention, a method is provided preferably using formation water and reduced amounts of additives so as to provide a dehydrated oil having a very low level of remaining water and sediment and an increased commercial value.

Figure 1:
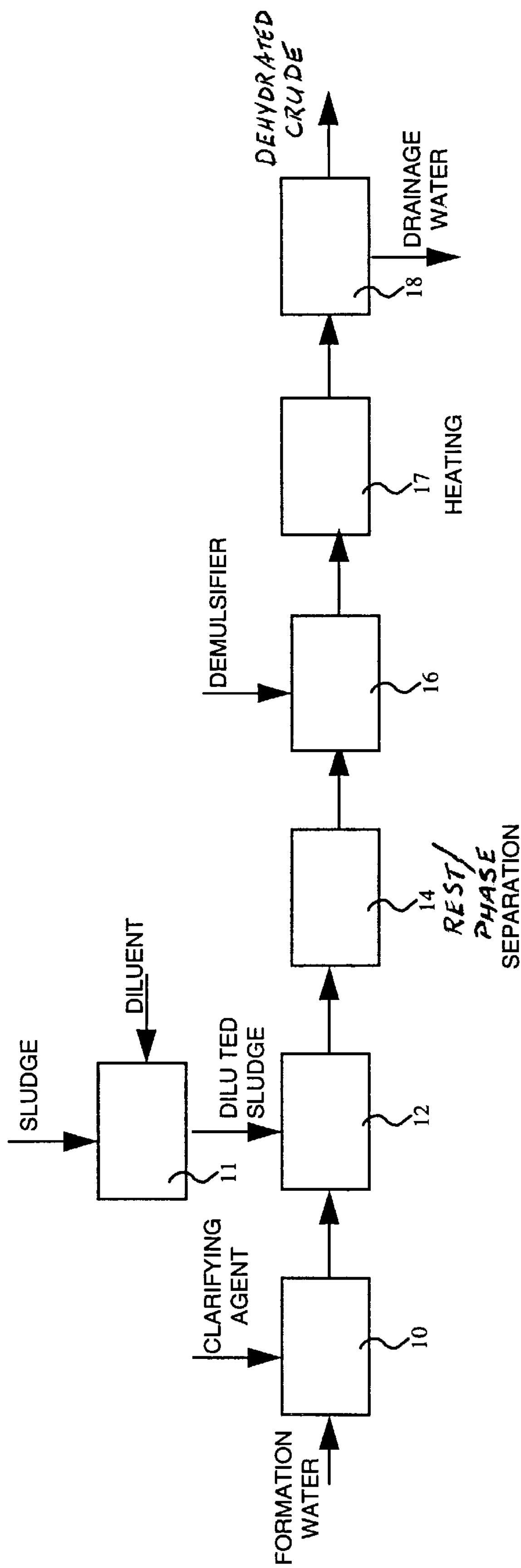
FIG. 1 schematically illustrates the method of the present invention.

FIG. 1 schematically illustrates a method in accordance with the present invention. As shown, formation water is mixed with a clarifying agent as indicated by step 10 so as to provide a solution of clarifying agent in formation water. This solution is mixed with sludge to be dehydrated as schematically illustrated in step 12 so as to provide a sludge-water mixture. This mixture is preferably allowed to rest as schematically illustrated in step 14 so as to allow at least partial separation of the hydrocarbon and water phases. The at least partially separated phases are then mixed with a demulsifier as schematically illustrated in step 16 so as to provide a sludge-water-demulsifier mixture, and this mixture is heated (step 17), preferably to a temperature of between about 100° F. and about 180° F., more preferably between about 170° F. and about 180° F., and then again allowed to rest as schematically illustrated in step 18 for a time sufficient to provide a dehydrated crude or hydrocarbon phase and a drainage water phase, wherein the hydrocarbon has a reduced water content which is preferably less than or equal to about 1% vol.

Sludge which may advantageously be treated in accordance with the present invention is generally in the form of an emulsion in the form of a water-in-oil emulsion, an oil-in-water emulsion, or mixtures thereof, wherein the oil phase is typically a hydrocarbon resulting from production well testing, completion, production or refinery operations. This type of sludge may have an initial content of water and sediment of approximately 10.0% volume or greater which severely reduces the commercial value of the hydrocarbon phase. The sludge to be dehydrated is typically produced as a mixture of crude oil, water and organic and inorganic solids, and is created as a waste of the various production processes. A typical sludge for treatment in accordance with the method of the present invention may of course have a wide variety of compositions and characteristics. One example of a typical sludge is a sludge characterized by a % BSW (Distillation method—ASTMD) of between about 3% and about 5%, a solids content of between about 0.1% and about 10%, and an API gravity of between about 9.01 and about 11.5.

Still referring to FIG. 1, prior to mixing with formation water, sludge may be mixed with a suitable diluent as schematically illustrated at step 11. Mixing with diluent serves advantageously to reduce viscosity of the sludge and thereby facilitate further treatment. Examples of suitable diluents include gasoil, light naphtha, and the like. Mixing with diluent serves to enhance the difference in density between the water and hydrocarbon phases and thereby facilitates phase separation as desired. The sludge and diluents are preferably mixed in amounts sufficient to provide at least about 20% (vol.) of diluent.

The water for use in accordance with the method of the present invention is preferably a formation water which may be water produced along with the hydrocarbon forming the oil phase of the sludge. In accordance with the present invention, it has been found that such formation water provides for advantageous treatment of the sludge in accordance with the present invention while reducing the amount of additives conventionally needed to obtain acceptable results. The formation water for use in accordance with the present invention may also have a wide variety of compositions and characteristics, and one example of a suitable formation water has a composition as set forth below in Table 1.

TABLE 1

| | | |
|---|---|---|
| ph | 7.2–8.73 | |
| Hardness, calcic | 306–3840 | ppm |
| Hardness, magnesia | 67–589 | ppm |
| Hardness, total | 452–6140 | ppm |
| Alkalinity "F" | 0 | ppm |
| Alkalinity "M" | 1167–2497 | ppm |
| Carbonates | 0–183 | ppm |
| Bicarbonates | 187–1420 | ppm |
| Chlorides | 229–12022 | ppm |
| Sulphates | 2–286 | ppm |
| Iron Total | 1.41–27.47 | ppm |
| Silica | 10.40–17.40 | ppm |
| T.D.S. | 8090–21061 | ppm |
| Conductivity | 16.11–42.41 | uS/cm |
| Potassium | 23–195 | ppm |
| Sodium | 790–7785 | ppm |
| Calcium | 25–391 | ppm |
| Magnesium | 7.2–143 | ppm |
| Salinity as NaCl | 2000–30000 | ppm |

In accordance with the invention, and as set forth below, it has been found that the use of formation water in accordance with the method of the present invention provides improved results as compared to numerous conventional methods such as attempted dehydration without washing, the use of fresh water, the use of acidic or basic solutions, and the use of prepared saline washing solutions.

The formation water is typically water indigenous from the reservoir, and is produced along with crude oil as part of the total produced fluids. The formation water may vary considerably in chemical composition depending primarily upon the reservoir geology and time period, and the water may contain different ionic species and dissolved solutions. of the foregoing characteristics of formation water suitable according to the invention, it is most preferable that the water have a salinity, preferably based substantially on NaCl, of between about 2,000 and about 30,000 ppm. It has been found that the valence of the salt components of the formation water impact upon the favorable results obtained with the method of the present invention.

The clarifying agent in accordance with the present invention is preferably a polymeric flocculent, preferably having a high surface activity, and may suitably be selected from the group consisting of oxyalkyl copolymers, polyalkanolamines, polyamines, polyacrylamines, polyacrylamide and mixtures thereof. The clarifying agent serves to enhance agglomeration of oil droplets so as to flocculate any dispersed oil phase. Clarifying agent is preferably mixed in amounts less than or equal to about 250 ppm.

The preferred demulsifier may be selected from the group consisting of cationic surface active agents, non-ionic surface active agents, and mixtures thereof. The demulsifier serves in accordance with the present invention to enhance and complete the separation of water from the hydrocarbon phase by encouraging coalescence of the dispersed water droplets of the sludge-water mixture so as to advantageously provide the dehydrated crude or hydrocarbon separated from the drainage water as desired in accordance with the present invention. Demulsifier is preferably mixed in amount less than or equal to about 300 ppm.

The mixing of formation water and clarifying agent may suitable be carried out so as to provide a concentration of clarifying agent of less than or equal to about 250 ppm based on volume of formation water. The clarifying agent and formation water are preferably mixed sufficiently so as to provide a substantially homogeneous dissolution of the clarifying agent throughout the formation water. The clarifying agent-formation water solution is then preferably mixed as indicated in step 12 of FIG. 1 with the sludge to be dehydrated. Clarifying agent-formation water solution and sludge are preferably mixed at a ratio by volume of water solution to hydrocarbon of at least about 1:1, and preferably between about 1:1 and about 9:1.

In step 14 as schematically illustrated in FIG. 1, the mixture of clarifying agent solution and sludge is allowed to rest, preferably for at least about 2 hours, so as to provide at least partial separation of the hydrocarbon and water phases, preferably so as to accomplish separation of at least about 60% vol. of the water phase, and more preferably leaving a water content in the sludge of less than or equal to about 20% vol.

After at least partial phase separation, a demulsifier as set forth above is preferably mixed with the water-sludge mixture, preferably in an amount sufficient to provide a concentration of demulsifier of less than or equal to about 300 ppm based upon hydrocarbon volume.

As schematically illustrated at step 18 in FIG. 1, the clarifying agent solution-sludge-demulsifier mixture is then preferably allowed to rest, preferably for a period of at least about two hours, or is decanted, so as to advantageously provide the desired dehydrated crude having water and sediment content of less than or equal to about 1% volume, and to provide drainage water which may suitably be treated to remove contaminants and then reused for the method of the present invention or, if preferred, for other applications.

In accordance with the present invention, it has been found that best results are obtained when the mixture of formation water with clarifying agent, sludge and demulsifier is heated (step 17) prior to resting step 18. It is preferred that this mixture be heated to a temperature of between about 100° F. and about 180° F., preferably between about 170° F. and about 180° F., and this heating is instrumental in providing the desired dehydration of sludge so as to provide water and sediment contents of less than or equal to about 1%. In this regard, the starting formation water may typically be at a temperature of about 120° F. while the aged sludge may typically be at a temperature of about 90° F.

Figure 2:
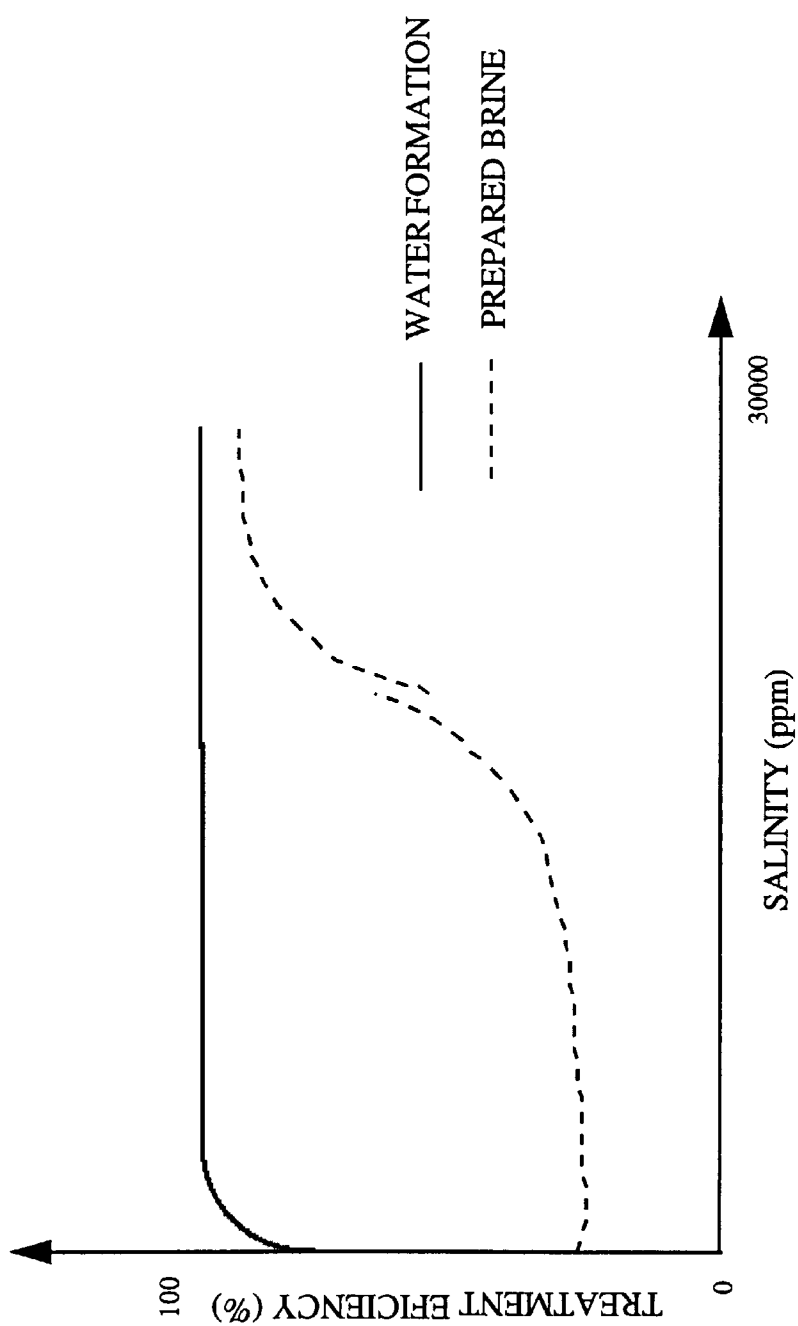
FIG. 2 illustrates treatment efficiency of the method of the present invention using formation water as compared to using prepared brine.

Referring to FIG. 2, the method of the present invention using formation water was evaluated against a washing method using a prepared brine so as to comparatively determine the treatment efficiency in removing water and sediment from the oil phase of a sludge. As shown in FIG. 2, the method using formation water in accordance with the present invention provided excellent treatment efficiency at very low levels of salinity. At increasing levels of salinity, the method using prepared brine gradually improved in efficiency and, at salinity levels approaching 30,000 ppm, the method using prepared brine began to approximate the efficiency obtained using formation water in accordance with the present invention.

Figure 3:
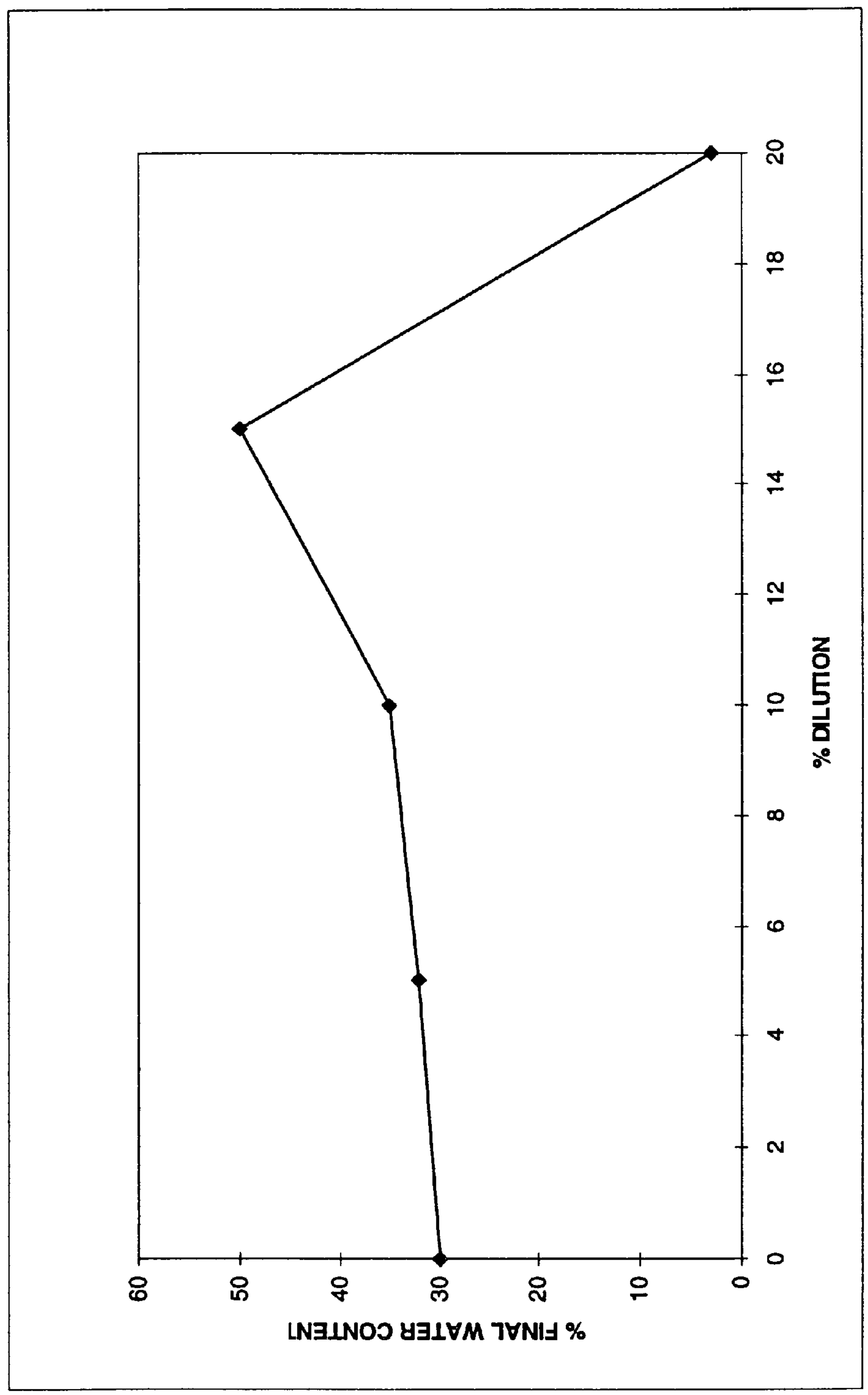
FIG. 3 illustrates the final water content accomplished using the proposed invention for various ranges of dilution.

FIG. 3 also illustrates the efficiency in terms of percent final water content as accomplished using the proposed method in accordance with the present invention for a range of dilution levels.

A water sludge was treated according to the method of the present invention using a gasoil as diluent in amounts of 5, 10, 15 and 20% vol. The method was carried out at a minimum temperature of 120° F., using 250 ppm clarifying agent and 300 ppm demulsifier with a ratio of water to crude of 1.5:1. The heating step was carried out at 170–180° F., and the final water content is illustrated in FIG. 3. As shown, best results were obtained as the diluent dilution approached 20% vol.

EXAMPLE 1

This example illustrates the method of the present invention using formation water as compared to a number of conventional processes using no washing water, using fresh water, using acidic or basis solutions, and using prepared brine or salt solutions. This example is carried out using a sludge having an initial water and sediment content of about 10%.

In carrying out each method, sludge was treating using the amounts of diluent, clarifying agent (BAROID REV) and demulsifier (NALCO E 90) as set forth in Table 2 below.

Table 2 below sets forth the results of this example:

TABLE 2

| Water Wash | Diluent (% Vol) | Clarifying (mg/1) | Demulsifier (mg/1) | B&S (Initial/final) % |
|---|---|---|---|---|
| Without Wash | 20 | — | 500 | 10.0/9.4 |
| Fresh | 20–35 | 500 | 500 | 10.0/24.0 |
| Acid | 10–20 | 500 | 500 | 10.0/10.0 |
| Basic | 20 | 500 | 500 | 10.0/14.0 |
| Formation | 15–20 | 240 | 248 | 10.0/0.7 |
| Salt | 20 | 500 | 500 | 10.0/2.4 |

As shown, the method in accordance with the present invention using formation water provided a reduction in water and sediment content (B&S) to 0.7%, which is drastically less than the final amount remaining using any other process evaluated. Furthermore, these advantageous results were obtained using significantly less amounts of clarifying agent and demulsifier.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for dehydrating a waste hydrocarbon sludge, comprising the steps of:

(a) providing a waste hydrocarbon sludge comprising oil, water and sediment wherein the content of water and sediment is greater than or equal to about 10% vol;

(b) providing a formation water;

(c) adding to the formation water a clarifying agent in an amount of less than or equal to 250 ppm based on the volume of the formation water so as to provide a solution;

(d) washing the waste water hydrocarbon sludge by mixing the waste hydrocarbon sludge with the solution so as to provide a sludge-water mixture having a ratio of water to hydrocarbon of at least about 1:1;

(e) holding the sludge-water mixture at rest for at least two hours so as to obtain partial separation of water from oil to provide a partially dewatered sludge-water mixture;

(f) adding a demulsifier to the partially dewatered sludge-water mixture to provide a sludge-water-demulsifier mixture;

(g) heating the sludge-water-demulsifier mixture to a sufficient temperature and holding for a time sufficient to provide a hydrocarbon phase having a water content of less than or equal to about 1% vol.

2. A method according to claim 1, wherein the waste hydrocarbon sludge comprises a mixture of crude oil, water, organic solids and inorganic solids.

3. A method according to claim 1, wherein the formation water has a salinity of between about 2,000–30,000 ppm.

4. A method according to claim 3, wherein the salinity is substantially NaCl based.

5. A method according to claim 1, wherein the formation water has a composition as follows:

| | | |
|---|---|---|
| ph | 7.2–8.73 | |
| Hardness, calcic | 306–3840 | ppm |
| Hardness, magnesia | 67–589 | ppm |
| Hardness, total | 452–6140 | ppm |
| Alkalinity "F" | 0 | ppm |
| Alkalinity "M" | 1167–2497 | ppm |
| Carbonates | 0–183 | ppm |
| Bicarbonates | 187–1420 | ppm |
| Chlorides | 229–12022 | ppm |
| Sulphates | 2–286 | ppm |
| Iron Total | 1.41–27.47 | ppm |
| Silica | 10.40–17.40 | ppm |
| T.D.S. | 8090–21061 | ppm |
| Conductivity | 16.11–42.41 | uS/cm |
| Potassium | 23–195 | ppm |
| Sodium | 790–7785 | ppm |
| Calcium | 25–391 | ppm |
| Magnesium | 7.2–143 | ppm |
| Salinity as Nacl | 2000–30000 | ppm |

6. A method according to claim 1, wherein the clarifying agent is selected from the group consisting of oxyalkyl copolymers, polyalkanolamines, polyamines, polyacrylamines, polyacrylamides and mixtures thereof.

7. A method according to claim 1, wherein the demulsifier is selected from the group consisting of cationic surface active agents, non-ionic surface active agents, and mixtures thereof.

8. A method according to claim 1, wherein the mixing step comprises mixing the waste hydrocarbon sludge with the solution so as to provide a ratio of water to hydrocarbon of between about 1:1 and about 9:1.

9. A method according to claim 1, wherein the heating step comprises heating the sludge-water-demulsifier mixture to a temperature of between about 100° F. and about 180° F.

10. A method according to claim 1, wherein the heating step comprises heating the sludge-water-demulsifier mixture to a temperature of between about 170° F. and about 180° F.

11. A method according to claim 1, wherein said sludge contains water and sediment, and further comprising carrying out step (g) until the hydrocarbon phase has a water and water and sediment content of less than or equal to about 1% vol.

12. A method according to claim 1, wherein the adding step comprises adding the demulsifier in an amount less than or equal to about 300 ppm based on hydrocarbon volume.

13. A method according to claim 1, further comprising the step of mixing the waste hydrocarbon sludge with a diluent so as to provide a diluent-sludge mixture and wherein step (d) comprises mixing the diluent-sludge mixture with the solution.

14. A method according to claim 13, wherein the diluent is selected from the group consisting of gasoil, light naphtha and mixtures thereof.

15. A method according to claim 13, wherein the diluent and sludge are mixed so as to provide the diluent-sludge mixture containing at least about 20% volume of diluent.

* * * * *